United States Patent
Buey et al.

(10) Patent No.: US 10,260,427 B2
(45) Date of Patent: Apr. 16, 2019

(54) VARIABLE AREA BYPASS NOZZLE

(71) Applicant: UNITED TECHNOLOGIES CORPORATION, Hartford, CT (US)

(72) Inventors: John R. Buey, Tolland, CT (US); Keegan M. Martin, Stafford Springs, CT (US)

(73) Assignee: United Technologies Corporation, Hartford, CT (US)

( * ) Notice: Subject to any disclaimer, the term of this patent is extended or adjusted under 35 U.S.C. 154(b) by 1188 days.

(21) Appl. No.: 14/203,637

(22) Filed: Mar. 11, 2014

(65) Prior Publication Data
US 2015/0122339 A1 May 7, 2015

Related U.S. Application Data

(60) Provisional application No. 61/788,412, filed on Mar. 15, 2013.

(51) Int. Cl.
| | |
|---|---|
| *F01D 9/00* | (2006.01) |
| *F02C 9/18* | (2006.01) |
| *F02K 1/08* | (2006.01) |
| *F02K 3/075* | (2006.01) |

(52) U.S. Cl.
CPC .............. *F02C 9/18* (2013.01); *F02K 1/085* (2013.01); *F02K 3/075* (2013.01); *Y10T 137/0363* (2015.04); *Y10T 137/2514* (2015.04)

(58) Field of Classification Search
USPC .................................................. 60/770, 771
See application file for complete search history.

(56) References Cited

U.S. PATENT DOCUMENTS

| | | | |
|---|---|---|---|
| 4,840,063 | A | 6/1989 | Twerdochlib |
| 4,870,859 | A | 10/1989 | Twerdochlib |
| 4,938,021 | A | 7/1990 | Jones et al. |
| 5,311,736 | A | 5/1994 | Lardellier |
| 6,751,944 | B2 | 6/2004 | Lair |
| 7,648,564 | B2 | 1/2010 | Chillar et al. |
| 7,788,899 | B2 | 9/2010 | Smith |
| 7,871,242 | B2 | 1/2011 | Swanson et al. |
| 7,877,980 | B2 | 2/2011 | Johnson |
| 8,276,364 | B2 | 10/2012 | Levasseur |
| 8,286,654 | B2 | 10/2012 | Prasad et al. |
| 2005/0274103 | A1 | 12/2005 | Prasad et al. |
| 2007/0163229 | A1 | 7/2007 | Prasad et al. |
| 2009/0208328 | A1 | 8/2009 | Stern |
| 2010/0215479 | A1 | 8/2010 | Prasad et al. |
| 2011/0167831 | A1 | 7/2011 | Johnson |
| 2011/0194992 | A1* | 8/2011 | Barton ............. B01J 7/02 422/239 |
| 2011/0198887 | A1 | 8/2011 | Rabhi |
| 2012/0028562 | A1 | 2/2012 | Heim et al. |

(Continued)

*Primary Examiner* — Jacob K Ackun
(74) *Attorney, Agent, or Firm* — Kinney & Lange, P.A.

(57) ABSTRACT

A gas turbine engine includes a first duct, a second duct, and a bladder. The bladder is disposed in the first duct and communicates with the second duct. A first gas flow is capable of passing through the first duct and a second gas flow is capable of passing through the second duct. The bladder is adapted to receive a bleed gas flow from the second duct and inflate within the first duct, thereby decreasing an area in the first duct through which the first gas flow is capable of traveling.

4 Claims, 3 Drawing Sheets

(56) References Cited

U.S. PATENT DOCUMENTS

2012/0280179 A1* 11/2012 Marsh .................... B01J 7/02
                                                                                                     252/372

2013/0295002 A1* 11/2013 Marsh .................... B01J 7/00
                                                                                                    423/579

* cited by examiner

VARIABLE AREA BYPASS NOZZLE

CROSS-REFERENCE TO RELATED APPLICATION(S)

This application claims priority from U.S. Provisional Application No. 61/788,412, filed Mar. 15, 2013, for "VARIABLE AREA BYPASS NOZZLE".

BACKGROUND

This invention relates generally to gas turbine engines, and more particularly, to a system for modulating a flow through a nozzle of a gas turbine engine.

Future mixed mission morphing aircraft as well as more conventional mixed mission capable military systems that have a high value of take-off thrust/take-off gross weight, present many challenges to the propulsion system. Such aircraft need efficient propulsion operation at diverse flight speeds, altitudes, and particularly at low power settings where conventional engines operate somewhat inefficiently. Prior solutions to improve engine efficiency utilize complex and/or costly configurations, including many moving parts. Many of these prior configurations add additional weight to the gas turbine engine.

SUMMARY

A gas turbine engine includes a first duct, a second duct, and a bladder. The bladder is disposed in the first duct and communicates with the second duct. A first gas flow is capable of passing through the first duct and a second gas flow is capable of passing through the second duct. The bladder is adapted to receive a bleed gas flow from the second duct and inflate within the first duct, thereby decreasing an area in the first duct through which the first gas flow is capable of traveling.

A kit includes a movable component, a bias element, and a bladder. The bias element is connected to the movable component. The bladder is configured to be connected to the movable component and is adapted to receive a bleed air therein. The bias element is adapted to exert a bias force on the movable component and the bladder.

A method of restricting gas flow through a first bypass duct of a gas turbine engine includes bleeding a gas flow from an engine source, and inflating a bladder with the gas flow within the first bypass duct.

A gas turbine engine includes a first duct, a gas source, and a bladder. A first gas flow is capable of traveling through the first duct. The gas source has a higher pressure than a pressure within the first duct. The bladder is disposed in the first duct and communicates with the gas source. The bladder is adapted to receive a gas flow from the gas source and inflate within the first duct, thereby decreasing an area in the first duct through which the first gas flow is capable of traveling.

DETAILED DESCRIPTION

Figure 1:
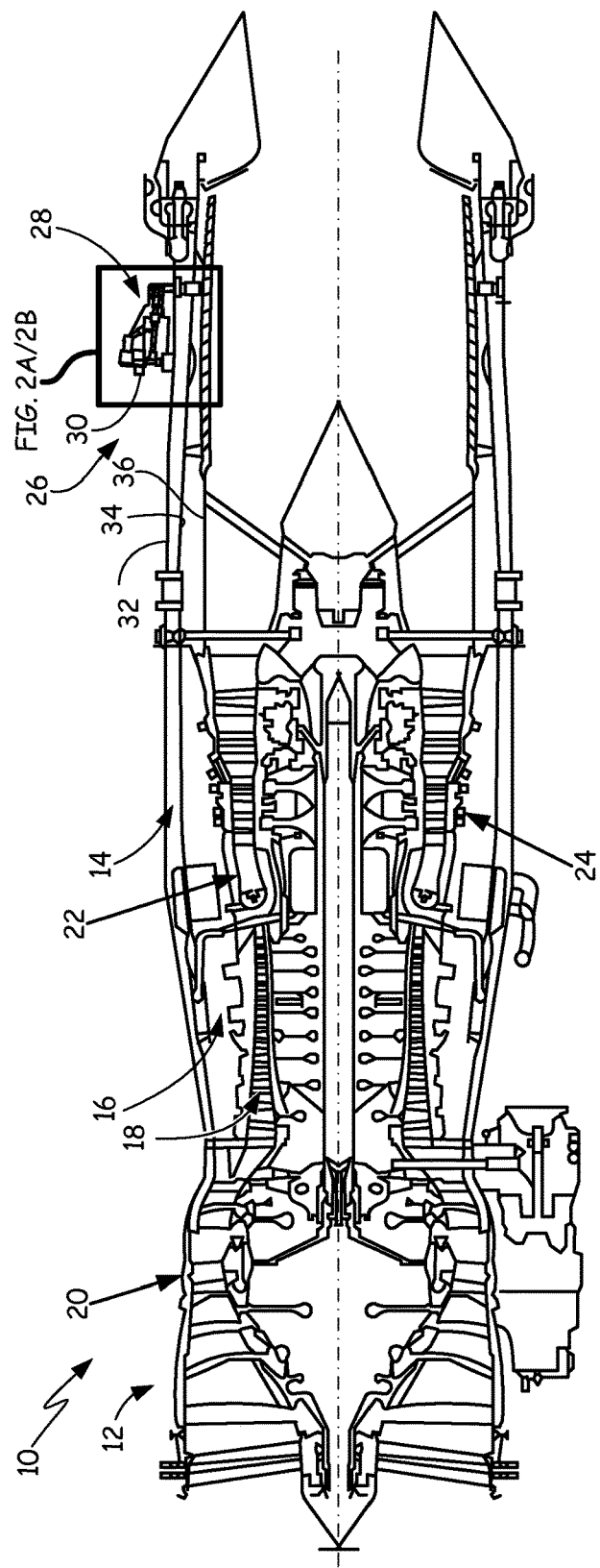
FIG. 1 is a schematic cross-sectional view of one embodiment of a gas turbine engine including a flow modulator assembly.

FIG. 1 schematically illustrates gas turbine engine 10. Gas turbine engine 10 includes fan section 12, secondary bypass duct 14, primary bypass duct 16, core flow 18, compressor section 20, combustor section 22, turbine section 24, nozzle section 26, and flow modulator assembly 28. Flow modulator assembly 28 includes actuator 30. Gas turbine engine 10 additionally includes secondary bypass outer duct 32, primary bypass outer duct 34, and turbine exhaust case 36.

In the embodiment of FIG. 1, gas turbine engine 10 comprises a three stream engine used for military applications. Gas flow enters fan section 12 and is divided downstream thereof to flow through secondary bypass duct 14, primary bypass duct 16, and core flow 18. Fan section 12, compressor section 20, combustor section 22, turbine section 24, and nozzle section 26 are arranged in flow series. Thus, compressor section 20 is arranged downstream of and communicates with fan section 12. Combustor section 22 is disposed downstream of and communicates with compressor section 20. Additionally, combustor section 22 is arranged upstream of and communicates with turbine section 24. Nozzle section 26 is disposed downstream of and communicates with turbine section 24. As used herein, the terms "downstream" and "upstream" are defined by the direction of gas flow through gas turbine 10.

Gas turbine engine 10 operates according to a continuous-flow, Brayton cycle. Fan section 12 receives gas flow entering gas turbine engine 10, works the gas flow to generate thrust, and passes the gas flow along through secondary bypass duct 14 and compressor section 20. Compressor section 20 pressurizes the gas flow and the gas flow is again divided with a first portion flowing through primary bypass duct 16 and a second portion continuing to flow along core gas flow path 18 through the remainder of compressor section 20, combustor section 22, turbine section 24, and nozzle section 26. As used herein, the portion of the total air flow entering one or both of first and second bypass ducts 14 or 16 is referred to as "bypass gas flow", while the remainder is referred to as the "core gas flow".

Fuel is added to core gas flow and the mixture is burned in combustor section 22. The combustion products expand through turbine section 24 where bladed rotors convert thermal energy from the combustion products into mechanical energy for rotating one or more centrally mounted shafts. The shafts, in turn, drive compressor section 20 and fan section 12, thus continuing the cycle. Gas turbine engines are compact and powerful power plants, making them suitable for powering aircraft, heavy equipment, ships and electrical power generators. Although shown in reference to a three stream gas turbine engine for military applications, flow modulator assembly 28 can also be used in two stream engines for commercial applications such as powering aircraft. The flow modulator assembly 28 can also be used in heavy equipment, ships and electrical power generators.

In FIG. 1, flow modulator assembly 28 is disposed in nozzle section 26 and regulates gas flow along secondary bypass duct 14 within nozzle section 26. Flow modulator assembly 28 includes actuator 30, which is mounted external to secondary bypass outer duct 32. In FIG. 1, secondary bypass outer duct 32 defines the outer radial wall of secondary bypass duct 14. Primary bypass outer duct 34 is disposed between and separates secondary bypass duct 14 and primary bypass duct 16. Thus, primary bypass outer duct 34 defines the inner radial wall of secondary bypass duct 14 as well as the outer radial wall of primary bypass duct 16. Turbine exhaust case 36 is disposed between and separates primary bypass duct 16 and core gas flow path 18. Thus, turbine exhaust case 36 defines the inner radial wall of primary bypass duct 16 as well as the outer radial wall of core gas flow path 18 in nozzle section 26.

Figure 2A:
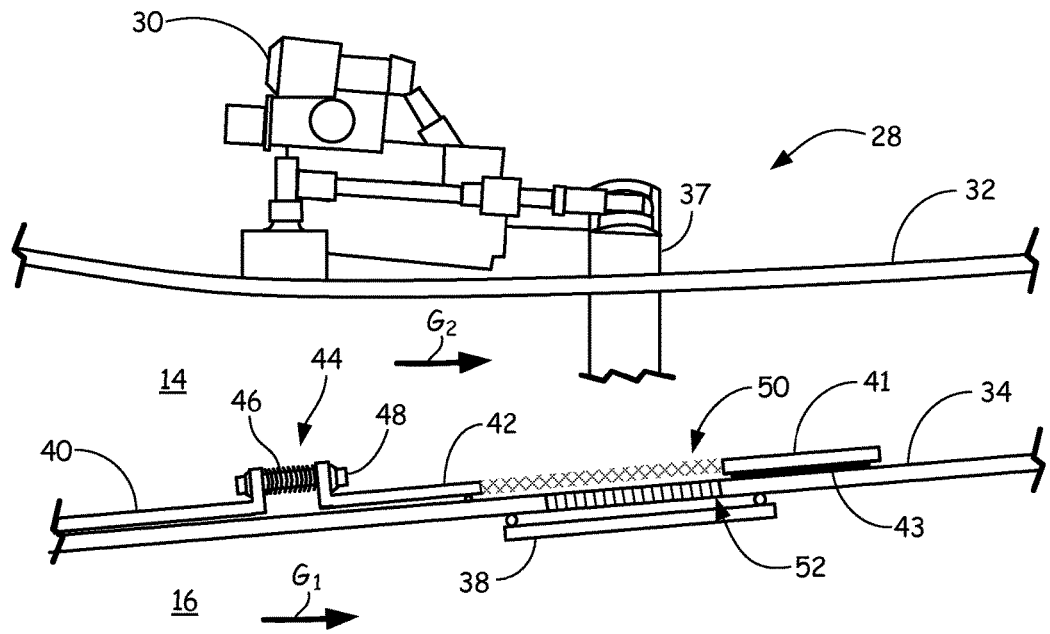
FIG. 2A is an enlarged schematic cross-sectional view of the flow modulator assembly of FIG. 1 in a non-deployed position.

FIG. 2A shows an enlargement of nozzle section 26 of FIG. 1, and illustrates one embodiment of flow modulator assembly 28 in a non-deployed position. In addition to actuator 30, flow modulator assembly 28 includes linkages 37, strap 38, first component 40, third component 42, bias assembly 44, and bladder 50. Bias assembly 44 includes bias element 46 and rod 48. Primary bypass outer duct 34 includes bleed passages 52.

Actuator 30 is mounted to secondary bypass outer duct 32 and is coupled to linkages 37. Linkages 37 extend through secondary bypass outer duct 32. For simplicity, only a portion of linkages 37 are shown in FIG. 2A. Linkages 37 extend through, secondary bypass duct 14, third component 42, and primary bypass outer duct 34 to connect to strap 38.

As shown in FIG. 2A, actuator 30, linkages 37, and strap 38 can comprise parts of a modulated exhaust cooling (MEC) assembly. One such assembly is described in U.S. Pat. No. 7,871,242, which is incorporated herein by reference. In brief, actuator 30 can comprise a hydraulic, pneumatic or electromagnetic actuator which controls the circumferential position of strap 38 through linkages 37. Linkages 37 comprise a kinematic system with various components such as cranks, pins, devises, and other elements that transfer torque and/or force from actuator 30 to strap 38. Actuator 30 can be used to selectively change the position of strap 38 in a circumferential direction relative to bleed passages 52 of primary bypass outer duct 34. Although illustrated as disposed within primary bypass duct 16 in the embodiment of FIG. 2A, in other embodiments strap 38 can be disposed within secondary bypass duct 14 such as between third component 42 and primary bypass outer duct 34 or radially outward of third component 42.

First component 40, second component 41, third component 42, bias assembly 44, and bladder 50 are disposed within secondary bypass duct 14 and extend along and interface with primary bypass outer duct 34. First component 40 is stationary and is connected to primary bypass outer duct 34. Second component 41 is stationary and is connected to primary bypass outer duct 34 by, for example, one or more welds 43. Third component 42 is spaced from first component 40 and is movable in an axial direction relative to primary bypass outer duct 34. In FIG. 2A, bias assembly 44 is connected between first component 40 and third component 42. Thus, bias element 46 and rod 48 are connected between first component 40 and third component 42. Bladder 50 is connected between second component 41 and third component 42, interfaces with, and is positioned radially outward of bleed passages 52 of primary bypass outer duct 34. In one embodiment, bladder 50 extends axially and circumferentially for the entire length of second component 41 and third component 42 within secondary bypass duct 14. In other embodiments, bladder 50 can be circumferentially spaced from adjacent bladders 50 about secondary bypass duct 14.

As shown in FIG. 2A, strap 38, first component 40, second component 41 and third component 42 comprise rings that extend in circumferential as well as axial directions. As shown in FIG. 2A, bias element 46 is adapted to bias bladder 50 toward a flattened position along primary bypass outer duct 34 of secondary bypass duct 14 so that bladder 50 minimally restricts gas flow $G_2$. In the embodiment shown in FIG. 2A, bias element 46 can be comprised of a spring such as a tension spring. However, in other embodiments other known methods of providing a bias on bladder 50 can be used including, for example, wave springs and compression springs. Rod 48 is telescoping allowing rod 48 to elongate in the axial direction. Bias element 46 acts to hold bladder in the non-deployed position illustrated in FIG. 2A.

Bladder 50 can be comprised of flexible materials that are capable of inflation including, for example, rubber, silicone, fabric, or wire mesh. The appropriate material is selected based upon operating conditions and other criteria. The material selected can be permeable so as to allow gas to pass through bladder 50 so that bladder 50 can deflate in some embodiments. In the embodiment shown in FIG. 2A, bladder 50 is comprised of a wire mesh distributed by Unique Wire Weaving Company Inc., of Hillside, N.J. The material composition for wire mesh can be selected based upon operating conditions and other criteria. In one embodiment, the density of the wire mesh is selected so as to be dense enough to allow bladder 50 to both inflate and deflate as desired.

In FIG. 2A, strap 38 is positioned to block gas flow $G_1$ passing through primary bypass duct 16 from passing through bleed passages 52 and into bladder 50. Bias element 46 is adapted to bias bladder 50 toward a flattened position along primary bypass outer duct 34 so that bladder 50 minimally restricts gas flow $G_2$ through secondary bypass duct 14.

Figure 2B:
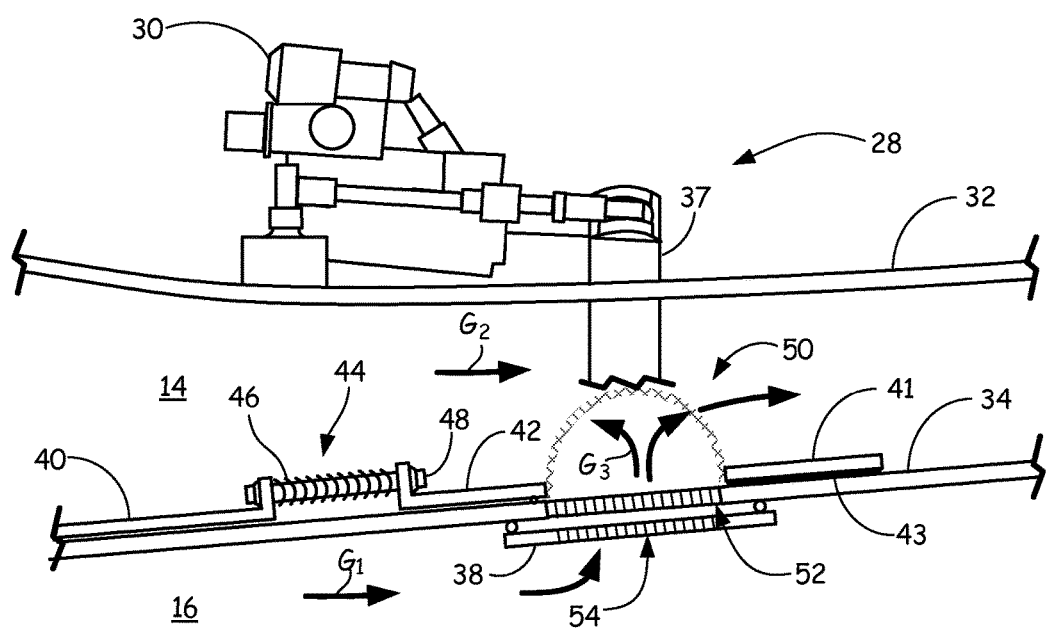
FIG. 2B is an enlarged schematic cross-sectional view of the flow modulator assembly of FIG. 2A in a deployed position.

FIG. 2B shows an enlargement of nozzle section 26 of FIG. 1, and illustrates flow modulator assembly 28 in a deployed position with bladder 50 inflated. Actuator 30 has rotated strap 38 circumferentially to dispose bleed passages 54 in strap 38 radially inward of bleed passages 52. Bleed passages 54 and bleed passages 52 generally align to allow bleed gas flow $G_3$ from gas flow $G_1$ to pass from primary bypass duct 16 and inflate bladder 50. In the embodiment shown, bladder 50 is permeable to allow bleed gas flow $G_3$ to pass through wire mesh and enter secondary bypass duct 14. Inflated bladder 50 restricts gas flow $G_2$ passing through secondary bypass duct 14. Thus, bladder 50 allows the gas flow through secondary bypass duct 14 to be modulated. Modulating gas flow through secondary bypass duct 14 allows gas turbine engine 10 to operate more efficiently at diverse operating conditions including different flight speeds, flight altitudes, etc.

In FIG. 2B, the inflation of bladder 50 has overcome the bias of bias assembly 44. Rod 48 has been extended and bias element 48 elongated due to the deformation of bladder 50. However, bladder 50 remains positioned radially outward of bleed passages 54 and bleed passages 52 to receive bleed gas flow $G_3$.

Figure 3A:
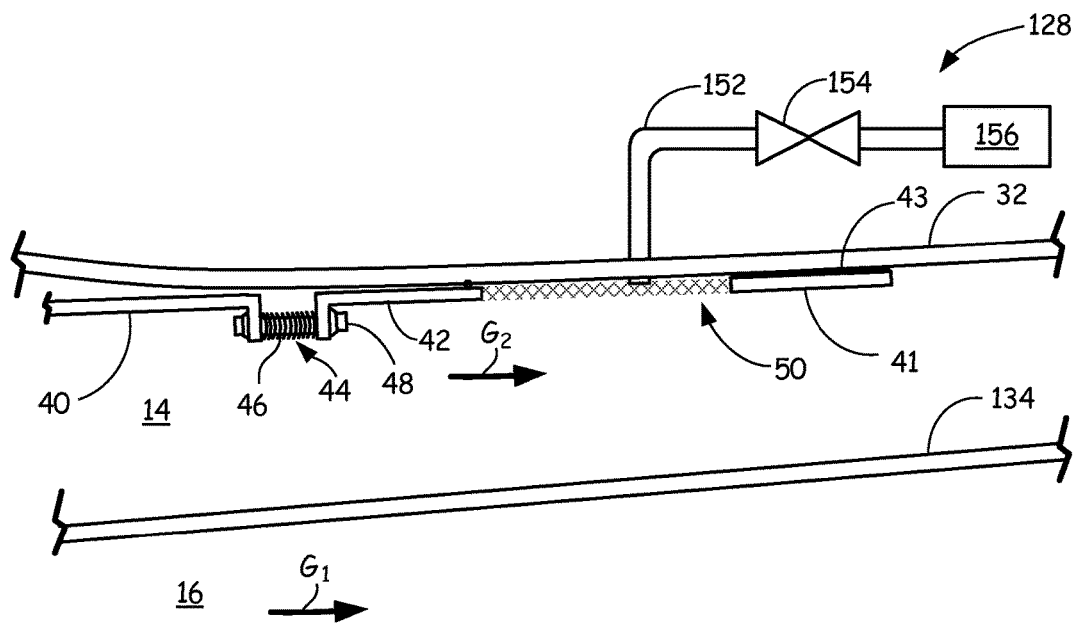
FIG. 3A shows a second embodiment of a flow modulator assembly in a non-deployed position.

FIG. 3A illustrates another embodiment of flow modulator assembly 128 in a non-deployed position. Like the embodiment of FIGS. 2A and 2B, the flow modulator assembly 128 of FIG. 3A includes first component 40, second component 41, third component 42, welds 43, bias assembly 44, and bladder 50. Bias assembly 44 includes bias element 46 and rod 48. Primary bypass outer duct 134 is continuous and does not include bleed passages 52 (FIGS. 2A and 2B).

Flow modulator assembly 128 additionally includes passages 152, valves 154, and source 156. First component 40, second component 41, third component 42, welds 43, bias assembly 44, and bladder 50 are constructed and operate in a manner similar to the embodiment of FIGS. 2A and 2B. However, first component 40, second component 41, third component 42, bias assembly 44, and bladder 50 are disposed adjacent secondary bypass outer duct 32 in the embodiment of FIG. 3A. Passages 152 comprise, for example, tubes or ducts, and extend through secondary bypass outer duct 32. Passages 152 connect to one or more valves 154, which regulate the passage of gas flow through passages 152 from source 156. Source 156 comprises a high pressure source such as compressor bleed.

In the non-deployed position illustrated in FIG. 3A, valves 154 are closed so that no gas flow passes to bladder 50. Bias element 46 is adapted to bias bladder 50 toward a flattened position along secondary bypass outer duct 32 of secondary bypass duct 14 so that bladder 50 minimally restricts gas flow $G_2$.

Figure 3B:
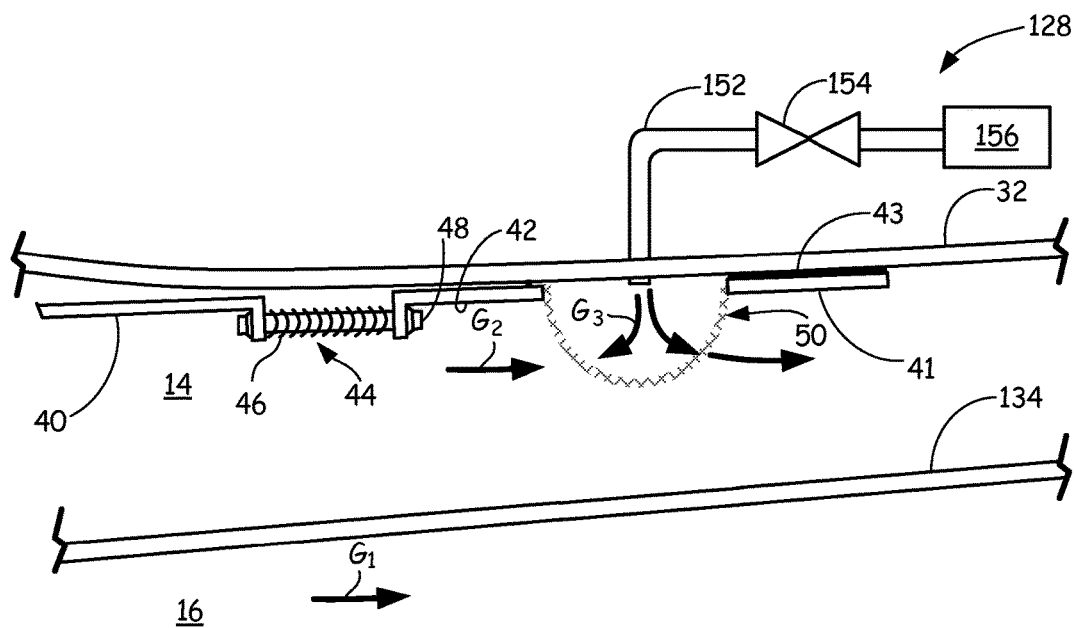
FIG. 3B shows the flow modulator assembly of FIG. 3A in a deployed position.

FIG. 3B shows flow modulator assembly 128 in a deployed position with bladder 50 inflated. The one or more valves 154 have been actuated to an open position to allow higher pressure gas flow to pass from source 156 to bladder 50 through passages 152. In the embodiment shown, bladder 50 is permeable to allow bleed gas flow $G_3$ to pass through wire mesh and enter secondary bypass duct 14. Inflated bladder 50 restricts gas flow $G_2$ passing through secondary bypass duct 14. Thus, bladder 50 allows the gas flow through secondary bypass duct 14 to be modulated.

Discussion of Possible Embodiments

The following are non-exclusive descriptions of possible embodiments of the present invention.

A gas turbine engine includes a first duct, a second duct, and a bladder. The bladder is disposed in the first duct and communicates with the second duct. A first gas flow is capable of passing through the first duct and a second gas flow is capable of passing through the second duct. The bladder is adapted to receive a bleed gas flow from the second duct and inflate within the first duct, thereby decreasing an area in the first duct through which the first gas flow is capable of traveling.

The gas turbine of the preceding paragraph can optionally include, additionally and/or alternatively, any one or more of the following features, configurations and/or additional components:

the bladder comprises a wire mesh;

the bladder is permeable to allow the bleed flow to pass through the bladder and enter the first duct;

a bias element is adapted to bias the bladder toward a flattened position along a wall of the first duct;

the bias element includes a spring and a telescoping rod;

a stationary component;

a movable component connected to the bladder, the bias element is connected between the stationary component and the moveable component and exerts a bias on the movable component;

the stationary component and the movable component comprise rings;

an actuator is mounted to the gas turbine engine;

a linkage is coupled to the actuator; and a movable element connected to the linkage, the movable element includes one or more bleed holes that allow the bleed gas flow to pass from the second duct to inflate the bladder; and the first duct and the second duct comprise bypass ducts, and the gas turbine engine additionally includes a core gas flow path.

A kit includes a movable component, a bias element, and a bladder. The bias element is connected to the movable component. The bladder is configured to be connected to the movable component and is adapted to receive a bleed air therein. The bias element is adapted to exert a bias force on the movable component and the bladder.

The kit of the preceding paragraph can optionally include, additionally and/or alternatively, any one or more of the following features, configurations and/or additional components:

the bladder comprises a wire mesh;

the bladder is permeable to allow the bleed flow to pass through the bladder and enter the first bypass duct;

the bias force biases the bladder toward a flattened position along a wall of a first bypass duct;

a stationary ring, the bias element is connected between the stationary component and the movable component;

the stationary component and the movable component comprise rings;

an actuator is mounted to the gas turbine engine;

a linkage is coupled to the actuator; and a movable element connected to the linkage, the movable element includes one or more bleed holes that allow the bleed gas flow to pass from the second duct to inflate the bladder; and the first duct and the second duct comprise bypass ducts, and the gas turbine engine additionally includes a core gas flow path.

A method of restricting gas flow through a first bypass duct of a gas turbine engine includes bleeding a gas flow from an engine source, and inflating a bladder with the gas flow within the first bypass duct.

The method of the preceding paragraph can optionally include, additionally and/or alternatively, any one or more of the following features, configurations and/or additional components:

actuating a movable element with one or more bleed holes to allow the gas flow to pass from the second duct to the bladder;

biasing the bladder toward a flattened position along a wall of the first bypass duct;

the engine source comprises a second bypass duct;

the engine source comprises a compressor.

A gas turbine engine includes a first duct, a gas source, and a bladder. A first gas flow is capable of traveling through the first duct. The gas source has a higher pressure than a pressure within the first duct. The bladder is disposed in the first duct and communicates with the gas source. The bladder is adapted to receive a gas flow from the gas source and inflate within the first duct, thereby decreasing an area in the first duct through which the first gas flow is capable of traveling.

The gas turbine engine of the preceding paragraph can optionally include, additionally and/or alternatively, any one or more of the following features, configurations and/or additional components:

the engine source comprises a second bypass duct; and the engine source comprises a compressor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A kit for a gas turbine engine comprising:
   a movable component;
   a bias element connected to the movable component; and
   a bladder configured to be connected to the movable component and adapted to receive a bleed air therein, wherein the bias element is adapted to exert a bias force on the movable component and the bladder, and wherein the bladder is permeable to allow a gas flow to pass through the bladder.
2. The kit of claim 1, wherein the bladder comprises a wire mesh.
3. The kit of claim 1, wherein the bias force of the bias element biases the bladder toward a deflated and flattened position.
4. The kit of claim 1, wherein the kit further includes:
   a stationary component, wherein the bias element is connected between the stationary component and the movable component.

* * * * *

UNITED STATES PATENT AND TRADEMARK OFFICE
CERTIFICATE OF CORRECTION

PATENT NO. : 10,260,427 B2
APPLICATION NO. : 14/203637
DATED : April 16, 2019
INVENTOR(S) : John R. Buey et al.

It is certified that error appears in the above-identified patent and that said Letters Patent is hereby corrected as shown below:

In the Specification

Column 3, Line 32:
Delete "devises"
Insert --clevises--

Signed and Sealed this
Eighteenth Day of June, 2019

Andrei Iancu
*Director of the United States Patent and Trademark Office*